(12) United States Patent
Michener et al.

(10) Patent No.: US 11,552,575 B1
(45) Date of Patent: Jan. 10, 2023

(54) SYSTEM AND METHOD FOR OPERATING MULTI-LEVEL POWER CONVERTER USING MULTIPLE DEADTIMES

(71) Applicant: General Electric Company, Schenectady, NY (US)

(72) Inventors: Nathaniel Robert Michener, Roanoke, VA (US); Fernando Arturo Ramirez Sanchez, Salem, VA (US); Steven Wade Sutherland, Roanoke, VA (US); Robert Gregory Wagoner, Roanoke, VA (US); Rajesh Bhupathi, Roanoke, VA (US); Igor Berroteran, Salem, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/405,311

(22) Filed: Aug. 18, 2021

(51) Int. Cl.
| | | |
|---|---|---|
| *H02M 5/458* | (2006.01) | |
| *H02M 7/487* | (2007.01) | |
| *H02M 1/38* | (2007.01) | |
| H02M 7/5388 | (2007.01) | |
| H02P 27/14 | (2006.01) | |
| H02M 1/00 | (2006.01) | |
| H02M 1/08 | (2006.01) | |

(52) U.S. Cl.
CPC ........... *H02M 5/458* (2013.01); *H02M 7/487* (2013.01); *H02M 1/0095* (2021.05); *H02M 1/08* (2013.01); *H02M 1/38* (2013.01); *H02M 7/5388* (2013.01); *H02P 27/14* (2013.01)

(58) Field of Classification Search
CPC ........ H02M 1/0095; H02M 1/08; H02M 1/38; H02M 5/458; H02M 7/487; H02M 7/5388; H02P 27/14
See application file for complete search history.

(56) References Cited

U.S. PATENT DOCUMENTS

| | | | |
|---|---|---|---|
| 6,697,274 B2 * | 2/2004 | Bernet | ................... H02M 7/487 363/132 |
| 8,310,796 B2 | 11/2012 | Wagoner | |
| 8,929,114 B2 * | 1/2015 | Li | ......................... H02M 7/487 363/130 |
| 9,048,831 B2 | 6/2015 | Wagoner et al. | |
| 9,184,650 B2 | 11/2015 | Shepard et al. | |
| 9,362,859 B2 | 6/2016 | Wagoner et al. | |
| 9,444,448 B2 | 9/2016 | Wagoner et al. | |
| 9,496,864 B2 | 11/2016 | Wagoner et al. | |

(Continued)

*Primary Examiner* — Jue Zhang
(74) *Attorney, Agent, or Firm* — Dority & Manning, P.A.

(57) ABSTRACT

A method for operating a multi-level bridge power converter includes providing a plurality of switching devices of the power converter in one of a neutral point clamped topology or an active neutral point clamped topology. The method also includes providing a plurality of deadtimes for the switching devices. Further, the method includes selecting one of the deadtimes for each of the switching devices such that at least two of the switching devices operate according to different deadtimes. Moreover, the method includes operating the switching devices at the selected deadtimes to allow a first group of the switching devices to switch slower than a second group of the switching devices such that the first group of the switching devices satisfy safe operating requirements while the second group of the switching devices switch faster than the first group.

20 Claims, 7 Drawing Sheets

(56) References Cited

U.S. PATENT DOCUMENTS

| | | | |
|---|---|---|---|
| 9,748,947 B1 | 8/2017 | Wagoner et al. | |
| 10,356,228 B2 | 7/2019 | Shepard et al. | |
| 2013/0155551 A1* | 6/2013 | Grbovic | H02H 7/1216 361/18 |
| 2015/0311776 A1* | 10/2015 | Lavieville | H02M 7/4833 363/65 |
| 2017/0185130 A1* | 6/2017 | Zhang | H02M 1/08 |
| 2017/0373586 A1* | 12/2017 | Zhang | H02M 7/5395 |
| 2021/0050797 A1* | 2/2021 | Xu | H02M 1/38 |

* cited by examiner

SYSTEM AND METHOD FOR OPERATING MULTI-LEVEL POWER CONVERTER USING MULTIPLE DEADTIMES

FIELD

The present disclosure relates generally to electrical power systems, and more particularly to a system and method for controlling an electrical power system having a multi-level power converter that applies multiple deadtimes to the switching devices thereof.

BACKGROUND

Wind turbines have received increased attention as a renewable energy source. Wind turbines use the wind to generate electricity. The wind turns multiple blades connected to a rotor. The spin of the blades caused by the wind spins a shaft of the rotor, which connects to a generator that generates electricity. Certain wind turbines include a doubly-fed induction generator (DFIG) to convert wind energy into electrical power suitable for output to an electrical grid. DFIGs are typically connected to a converter that regulates the flow of electrical power between the DFIG and the grid. More particularly, the converter allows the wind turbine to output electrical power at the grid frequency regardless of the rotational speed of the wind turbine blades.

A typical DFIG system includes a wind driven DFIG having a rotor and a stator. The stator of the DFIG is coupled to the electrical grid through a stator bus. A power converter is used to couple the rotor of the DFIG to the electrical grid. The power converter can be a two-stage power converter including both a rotor side converter and a line side converter. The rotor side converter can receive alternating current (AC) power from the rotor via a rotor bus and can convert the AC power to a DC power. The line side converter can then convert the DC power to AC power having a suitable output frequency, such as the grid frequency. The AC power is provided to the electrical grid via a line bus. An auxiliary power feed can be coupled to the line bus to provide power for components used in the wind turbine system, such as fans, pumps, motors, and other components of the wind turbine system.

Referring to FIG. 1, a multi-level inverter neutral point clamped (NPC) topology according to conventional construction is illustrated. As shown, the solid arrows indicate hard diode recovery, the dotted arrows indicate lossless recovery, and the boxed arrows indicate transitions controlled by the current direction. As such, the multilevel inverter topology leverages the series connection of multiple switching devices to reach higher operating voltages. For example, as shown, during switching operations of the three-level inverter, the AC terminal can be electrically connected to three possible voltages, i.e., positive, negative and midpoint. Furthermore, as shown, connection to the midpoint voltage is typically completed through diodes D5 and D6. However, the presence of these alternate paths lead to the creation of long and short commutation paths, and thus, different parasitic inductance levels.

More specifically, such differences create large voltage overshoots at the inner switching devices (e.g., S2 and S3) due to the increased parasitic inductance. As used herein, the turnoff overshoots are directly caused by energy stored in the parasitic inductances of the bridge construction. This energy is proportional to the size of the inductance and the magnitude of the current being commutated. This excess voltage overshoot can damage the affected devices, and requires a gate driver design that results in more losses and less margin in the power converter. Increased parasitic inductance can also negatively affect diode operation, thereby causing increased diode losses and reduced converter rating. Such losses translates to more heat and lower bridge rating. Thus, typical solutions for reducing the voltage overshoots include soft switching and/or snubber circuits, which can cause slower switching speeds and increased costs.

A solution to the voltage overshoot problem is to switch the IGBTs more slowly by reducing the turn off speed with the gate driver design (reducing the rate of charge extraction from the IGBT gate). However, this causes increased losses, and reduces the efficiency of the power converter, so it is better to only switch the inner devices slowly, and to maintain fast switching on the outer devices.

Additionally, when switching IGBTs in a multi-level power converter, it is necessary to provide a lockout time or deadtime during which the power converter is held in a safe state, while one switch finishes turning off, prior to turning the next switch on. This deadtime presents a problem in that it causes distortion of the output signal of the power converter, in proportion with the length of the deadtime (i.e., a longer deadtime results in more distortion). Further, selecting a single deadtime for a multi-level power converter with different switching speeds for inner and outer IGBTs causes worse-than-optimal harmonic distortion performance, requiring larger and more expensive filters to meet grid codes.

Accordingly, the present disclosure is directed to a system and method for controlling an electrical power system having a multi-level power converter that applies multiple deadtimes to the switching devices thereof so as to address the aforementioned issues.

BRIEF DESCRIPTION

Aspects and advantages of the disclosure will be set forth in part in the following description, or may be obvious from the description, or may be learned through practice of the disclosure.

In one aspect, the present disclosure is directed to a method for operating a multi-level bridge power converter of an electrical power system connected to a power grid. The power converter includes a first converter coupled to a second converter via a DC link. The method includes providing a plurality of switching devices of the power converter in one of a neutral point clamped topology or an active neutral point clamped topology. The method also includes providing a plurality of deadtimes for the plurality of switching devices of the power converter. Further, the method includes selecting one of the plurality of deadtimes for each of the plurality of switching devices such that at least two of the plurality of switching devices operate according to different deadtimes of the plurality of deadtimes. Moreover, the method includes operating the plurality of switching devices at the selected deadtimes to allow a first group of the plurality of switching devices to switch slower than a second group of the plurality of switching devices such that the first group of the plurality of switching devices satisfy safe operating requirements while the second group of the plurality of switching devices switch faster than the first group of the plurality of switching devices.

In an embodiment, the method may also include selecting one of the plurality of deadtimes for each of the plurality of switching devices such that at least two of the plurality of switching devices operate according to different deadtimes of the plurality of deadtimes based on one or more switching properties of each of the plurality of switching devices.

In another embodiment, the plurality of switching devices may include, at least, a plurality of insulated gate bipolar transistor (IGBT) modules, wherein each of the plurality of IGBT modules comprises at least one IGBT switch and at least one antiparallel diode.

In certain embodiments, the plurality of IGBT modules may include a first IGBT module comprising a first IGBT switch coupled to a first antiparallel diode, a second IGBT module comprising a second IGBT switch coupled to a second antiparallel diode, a third IGBT module comprising a third IGBT switch coupled to a third antiparallel diode, a fourth IGBT module comprising a fourth IGBT switch coupled to a fourth antiparallel diode, a fifth IGBT module comprising a fifth IGBT switch coupled to a fifth antiparallel diode, and a sixth IGBT module comprising a sixth IGBT switch coupled to a sixth antiparallel diode, the at least one antiparallel diode comprising at least one of the first antiparallel diode, the second antiparallel diode, the third antiparallel diode, the fourth antiparallel diode, the fifth antiparallel diode, or the sixth antiparallel diode.

In further embodiments, the first group of the plurality of switching devices may include inner switching devices of the plurality of switching devices and the second group of the plurality of switching devices may include outer switching devices. In such embodiments, the second IGBT module, the third IGBT module, the fifth IGBT module, and the sixth IGBT module may be the inner switching devices, whereas the first IGBT module and the fourth IGBT module may be the outer switching devices.

In several embodiments, selecting one of the plurality of deadtimes for each of the plurality of switching devices such that at least two of the plurality of switching devices operate according to different deadtimes of the plurality of deadtimes may include selecting a first deadtime of the plurality of deadtimes for the inner switching devices and selecting a second deadtime of the plurality of deadtimes for the outer switching devices. In such embodiments, the first deadtime is greater than the second deadtime. In particular embodiments, for example, the second deadtime is equal to about half of the first deadtime.

In additional embodiments, the method may include operating the plurality of switching devices at the selected deadtimes via a plurality of gate drivers.

In another embodiment, the multi-level bridge power converter is a three-level bridge power converter. Further, in an embodiment, the electrical power system may include a wind turbine power system, a solar power system, an energy storage power system, or combinations thereof.

In another aspect, the present disclosure is directed to an electrical power system. The electrical power system includes a doubly-fed induction generator having a rotor and a stator. The stator provides AC power to a stator bus. The electrical power system also includes a multi-level bridge power converter coupled to the rotor of the doubly-fed induction generator. The power converter includes a first converter coupled to a second converter via a DC link. At least one of the first converter or the second converter includes a plurality of switching devices arranged in one of a neutral point clamped topology or an active neutral point clamped topology. The electrical power system also includes a controller communicatively coupled to the power converter. The controller includes at least one processor configured to implement a plurality of operations, including but not limited to selecting one of a plurality of deadtimes for each of the plurality of switching devices such that at least two of the plurality of switching devices operate according to different deadtimes of the plurality of deadtimes and operating the plurality of switching devices at the selected deadtimes to allow a first group of the plurality of switching devices to switch slower than a second group of the plurality of switching devices such that the first group of the plurality of switching devices satisfy safe operating requirements while the second group of the plurality of switching devices switch faster than the first group of the plurality of switching devices. It should be understood that the electrical power system may further include any of the additional features described herein.

In yet another aspect, the present disclosure is directed to a method for operating a multi-level bridge power converter of an electrical power system connected to a power grid. The power converter has a first converter coupled to a second converter via a DC link. The method includes providing a plurality of switching devices of the power converter in one of a neutral point clamped topology or an active neutral point clamped topology. Further, the plurality of switching devices include inner switching devices and outer switching devices. The method also includes providing a first deadtime for the inner switching devices and a second deadtime for the outer switching devices. Moreover, the method includes operating the plurality of switching devices at the first and second deadtimes to allow inner switching devices to switch slower than the outer switching devices such that the inner switching devices satisfy safe operating requirements while the outer switching devices switch faster than the inner switching devices. It should be understood that the method may further include any of the additional steps and/or features described herein.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
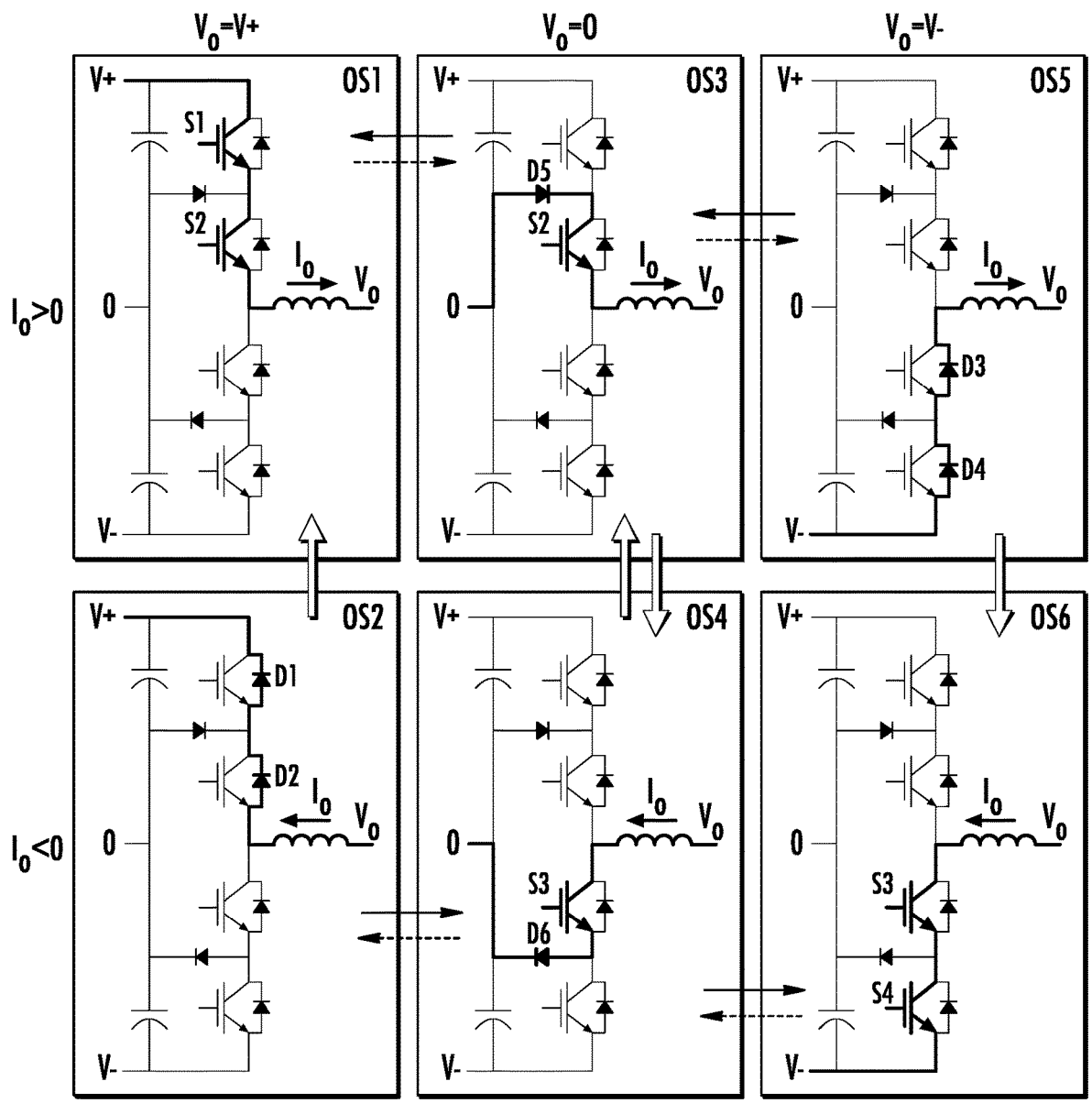
FIG. 1 illustrates a schematic diagram of a switching sequence of a three-level inverter according to conventional construction.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

On a typical three-level inverter, there are various operating states and transitional deadtime states. Accordingly, for a typical inverter, the inner switching devices can interrupt current while coming out of the deadtime state and/or the neutral state. In other words, the inner switching devices require a long deadtime in order to support their long turnoff; however, the outer switching devices can support a faster turnoff time. As such, a single deadtime has to be chosen for the inner switching devices. Typically, a single lockout time is set for all devices in the power converter. However, the present disclosure applies one of two different deadtimes to each switching device in the power converter based on the switching properties of that device. Accordingly, the present disclosure is directed to methods and systems that use multiple deadtimes to allow the inner switching devices to be switched slowly with a larger deadtime in order to meet Safe Operating Area (SOA) requirements, while the outer switching devices switch quickly, e.g., in order to minimize harmonic distortion and/or to reduce the need for filtering on the fault detection algorithm.

It should be appreciated that numerous advantages may be provided by operating a power converter as described herein. Specifically, the systems and methods of the present disclosure can be applied to many electrical power systems, such as a wind turbine power system, a solar power system, an energy storage power system, or combinations thereof. Further, the present disclosure does not require additional hardware. Moreover, the present disclosure enables the power converter to extend its safe operating area (SOA) without adding more semiconductors.

Figure 2:
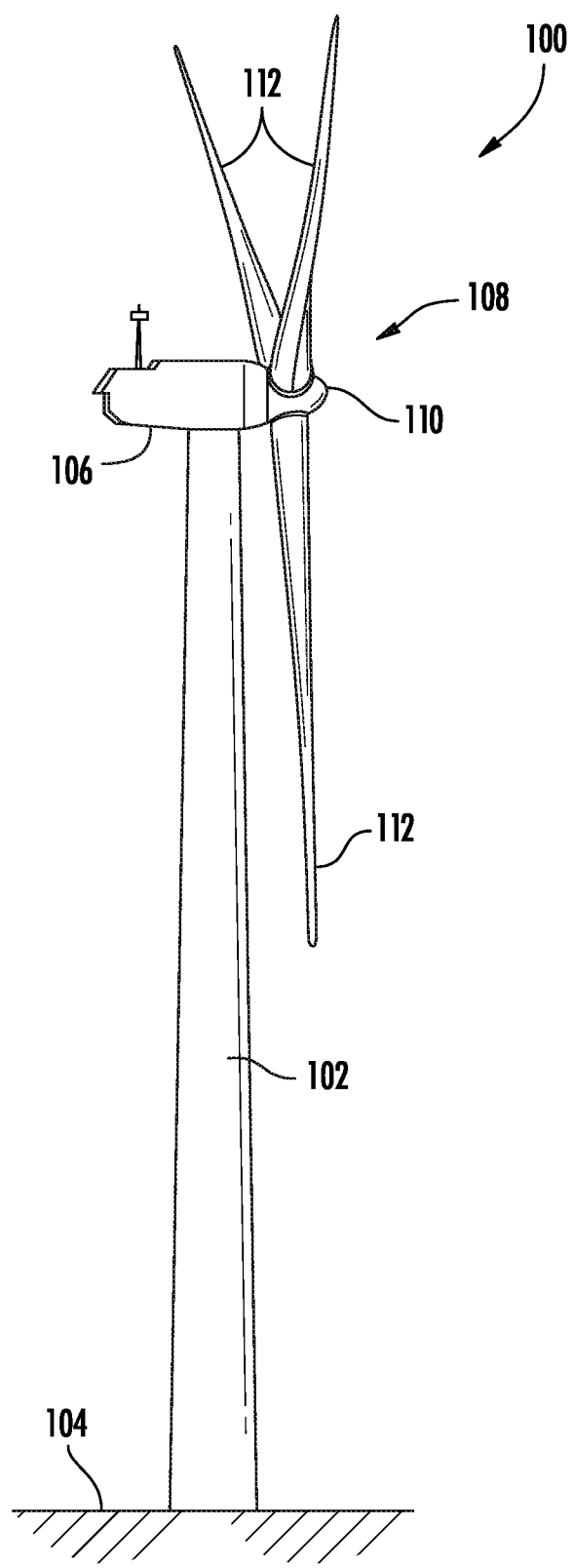
FIG. 2 illustrates a perspective view of one embodiment of a wind turbine according to the present disclosure.

Referring now to the drawings, FIG. 2 illustrates a perspective view of one embodiment of a wind turbine 100. As shown, the wind turbine 100 generally includes a tower 102 extending from a support surface 104, a nacelle 106 mounted on the tower 102, and a rotor 108 coupled to the nacelle 106. The rotor 108 includes a rotatable hub 110 and at least one rotor blade 112 coupled to and extending outwardly from the hub 10. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, as will be described below, the rotor 108 may be rotatably coupled to a generator 220 (FIG. 3) to permit electrical energy to be produced.

Figure 3:
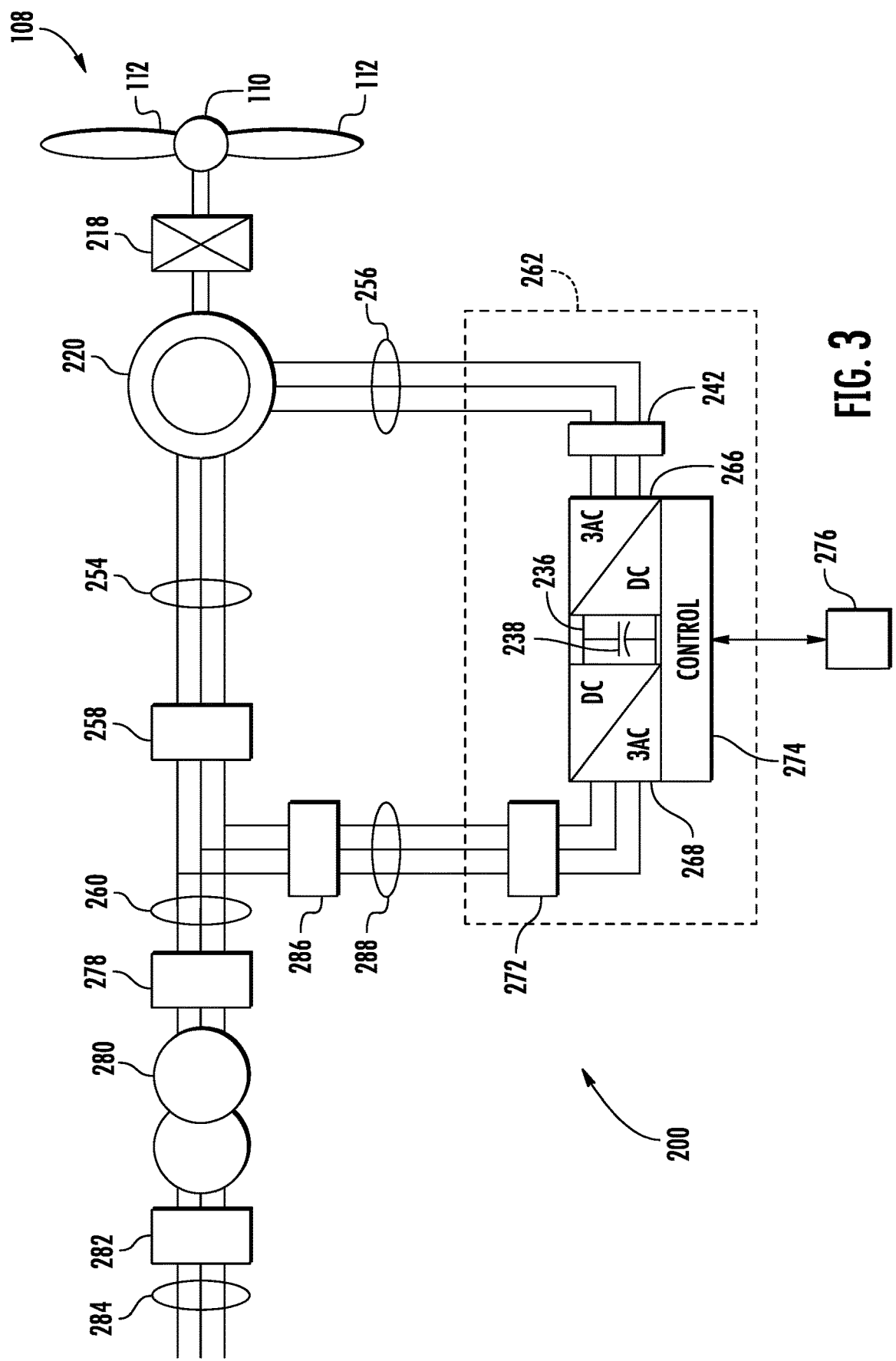
FIG. 3 illustrates a schematic diagram of one embodiment of a DFIG wind turbine system according to the present disclosure.

Referring now to FIG. 3, a schematic diagram of one embodiment of a wind turbine power system 200 is illustrated in accordance with aspects of the present subject matter. It should be appreciated that the present subject matter will generally be described herein with reference to the wind turbine power system 200 shown in FIG. 3. However, those of ordinary skill in the art, using the disclosures provided herein, should understand that aspects of the present disclosure may also be applicable in other power generation systems.

As shown, the rotor 108 of the wind turbine 100 may, optionally, be coupled to a gear box 218, which is, in turn, coupled to the generator 220. In accordance with aspects of the present disclosure, the generator 220 may be a doubly-fed induction generator (DFIG). For example, as shown, the DFIG 220 may be coupled to a stator bus 254 and a power converter 262 via a rotor bus 256. The stator bus 254 may provide an output multiphase power (e.g., three-phase power) from a stator of the DFIG 220 and the rotor bus 256 may provide an output multiphase power (e.g., three-phase power) from a rotor of the DFIG 120. As shown in FIG. 3, the power converter 262 includes a rotor side converter 266 and a line side converter 268. The DFIG 220 may be coupled via the rotor bus 256 to the rotor side converter 266. Additionally, the rotor side converter 266 may be coupled to the line side converter 268 which may, in turn, be coupled to a line side bus 288. In particular embodiments, the power converter 262 may be a multi-level bridge power converter, such as a three-level bridge power converter, or higher. As described herein, three-level converters are converters that have three direct current (DC) poles. In addition to positive and negative DC poles, such converters also have a neutral DC pole.

In several embodiments, the rotor side converter 266 and the line side converter 128 may be configured for normal operating mode in a three-phase, pulse width modulation (PWM) arrangement using insulated gate bipolar transistor (IGBT) switching devices as will be discussed in more detail with respect to FIG. 3. The rotor side converter 266 and the line side converter 268 may be coupled via a DC link 126 across which is a DC link capacitor 238.

In addition, the power converter 262 may be coupled to a controller 274 in order to control the operation of the rotor side converter 266 and the line side converter 268. It should be noted that the controller 274 may, in several embodiments, be configured as an interface between the power converter 262 and a control system 276. The controller 274 may include any number of control devices. In one embodiment, the controller 274 may include a processing device (e.g., microprocessor, microcontroller, etc.) executing computer-readable instructions stored in a computer-readable medium. The instructions when executed by the processing device may cause the processing device to perform operations, including providing control commands to the switching devices and/or the shorting devices of the power converter 262.

In typical configurations, various line contactors and circuit breakers including, for example, a grid breaker 282 may also be included for isolating the various components as necessary for normal operation of the DFIG 220 during connection to and disconnection from the electrical grid 284. For example, a system circuit breaker 278 may couple the system bus 260 to a transformer 280, which may be coupled to the electrical grid 284 via the grid breaker 282. In alternative embodiments, fuses may replace some or all of the circuit breakers.

In operation, alternating current power generated at the DFIG 220 by rotating the rotor 108 is provided via a dual path to the electrical grid 284. The dual paths are defined by the stator bus 254 and the rotor bus 256. On the rotor bus side 256, sinusoidal multi-phase (e.g., three-phase) alternating current (AC) power is provided to the power converter 262. The rotor side power converter 266 converts the AC power provided from the rotor bus 256 into direct current (DC) power and provides the DC power to the DC link 236. As is generally understood, switching devices (e.g., IGBTs) used in the bridge circuits of the rotor side power converter 266 may be modulated to convert the AC power provided from the rotor bus 256 into DC power suitable for the DC link 236.

In addition, the line side converter 268 converts the DC power on the DC link 126 into AC output power suitable for the electrical grid. In particular, switching devices (e.g., IGBTs) used in bridge circuits of the line side power converter 268 can be modulated to convert the DC power on the DC link 236 into AC power on the line side bus 288. The AC power from the power converter 262 can be combined with the power from the stator of DFIG 220 to provide multi-phase power (e.g., three-phase power) having a frequency maintained substantially at the frequency of the electrical grid 284 (e.g., 50 Hz or 60 Hz).

Additionally, various circuit breakers and switches, such as grid breaker 282, system breaker 278, stator sync switch 258, converter breaker 286, and line contactor 272 may be included in the system 200 to connect or disconnect corresponding buses, for example, when current flow is excessive and may damage components of the wind turbine system 100 or for other operational considerations. Additional protection components may also be included in the wind turbine system 200, such as the crowbar circuit described below.

Moreover, the power converter 262 may receive control signals from, for instance, the control system 276 via the controller 274. The control signals may be based, among other things, on sensed conditions or operating characteristics of the wind turbine system 200. Typically, the control signals provide for control of the operation of the power converter 262. For example, feedback in the form of a sensed speed of the DFIG 220 may be used to control the conversion of the output power from the rotor bus 256 to maintain a proper and balanced multi-phase (e.g., three-phase) power supply. Other feedback from other sensors may also be used by the controller 274 to control the power converter 262, including, for example, stator and rotor bus voltages and current feedbacks. Using the various forms of feedback information, switching control signals (e.g., gate timing commands for IGBTs), shorting control signals, stator synchronizing control signals, and circuit breaker signals may be generated.

Figure 4:
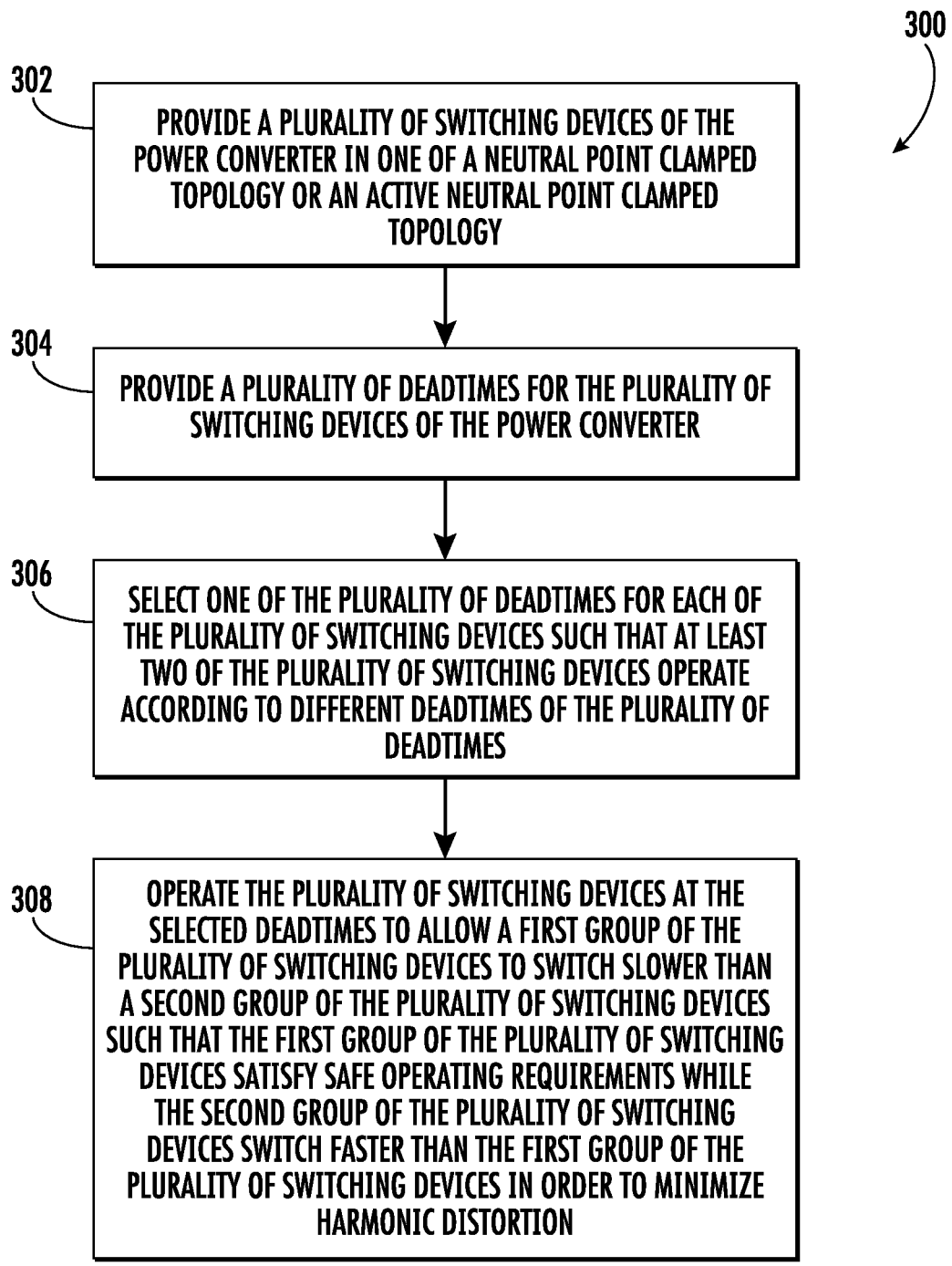
FIG. 4 illustrates a flow diagram of one embodiment of a method for operating a multi-level bridge power converter of an electrical power system connected to a power grid according to the present disclosure.

Referring now to FIG. 4, a flow diagram of one embodiment of a method 300 for operating a multi-level bridge power converter of an electrical power system connected to a power grid is illustrated in accordance with aspects of the present subject matter. In general, the method 300 will be described herein as being implemented using a wind turbine system, such as the DFIG wind turbine system 200 described above with reference to FIGS. 1-2 and 5-6. However, it should be appreciated that the disclosed method 300 may be implemented using any other suitable power generation system that is configured to supply power for application to a load. In addition, although FIG. 4 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

Figure 5:
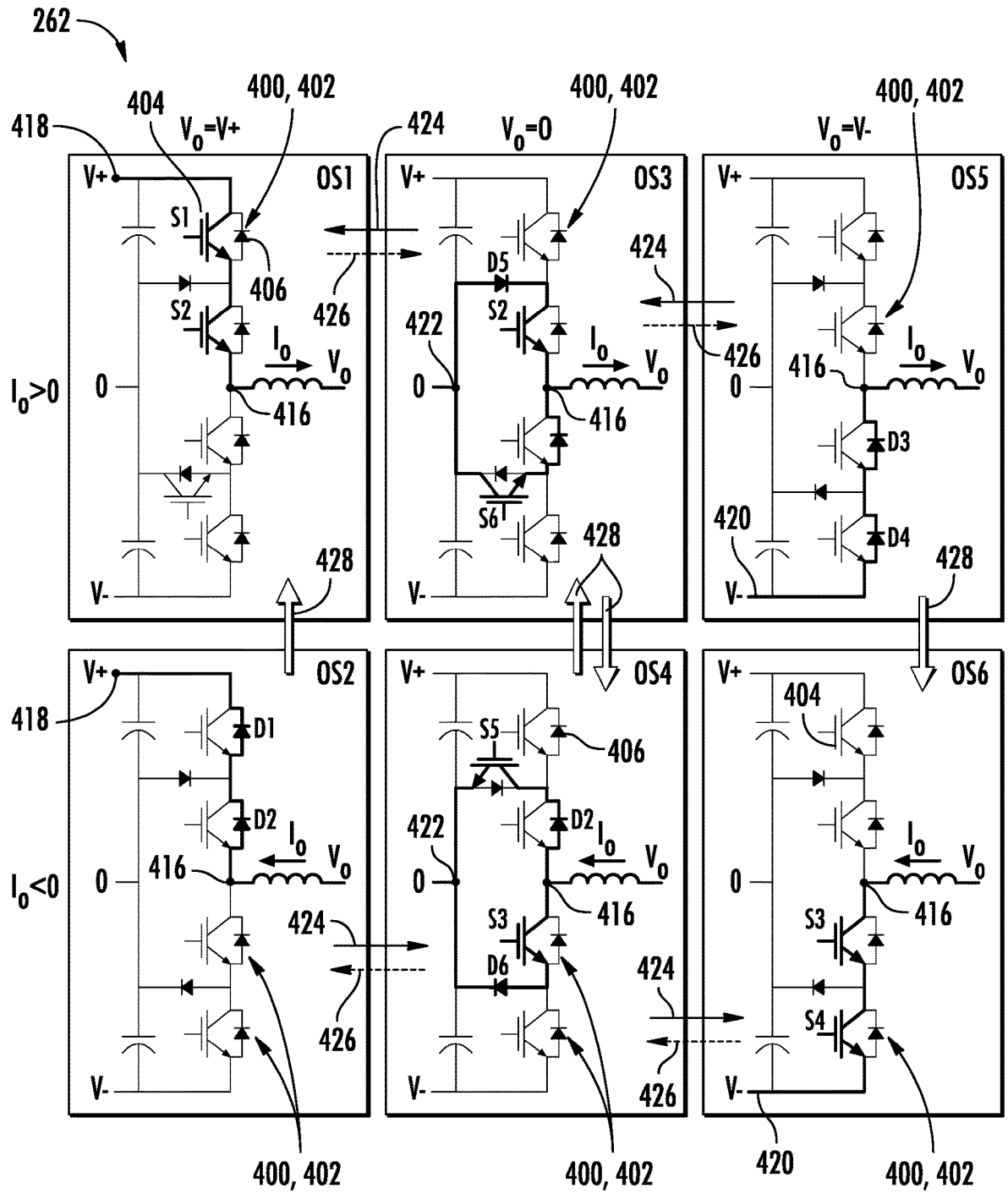
FIG. 5 illustrates a schematic diagram of one embodiment of a switching sequence of a three-level inverter according to the present disclosure.
Figure 6:
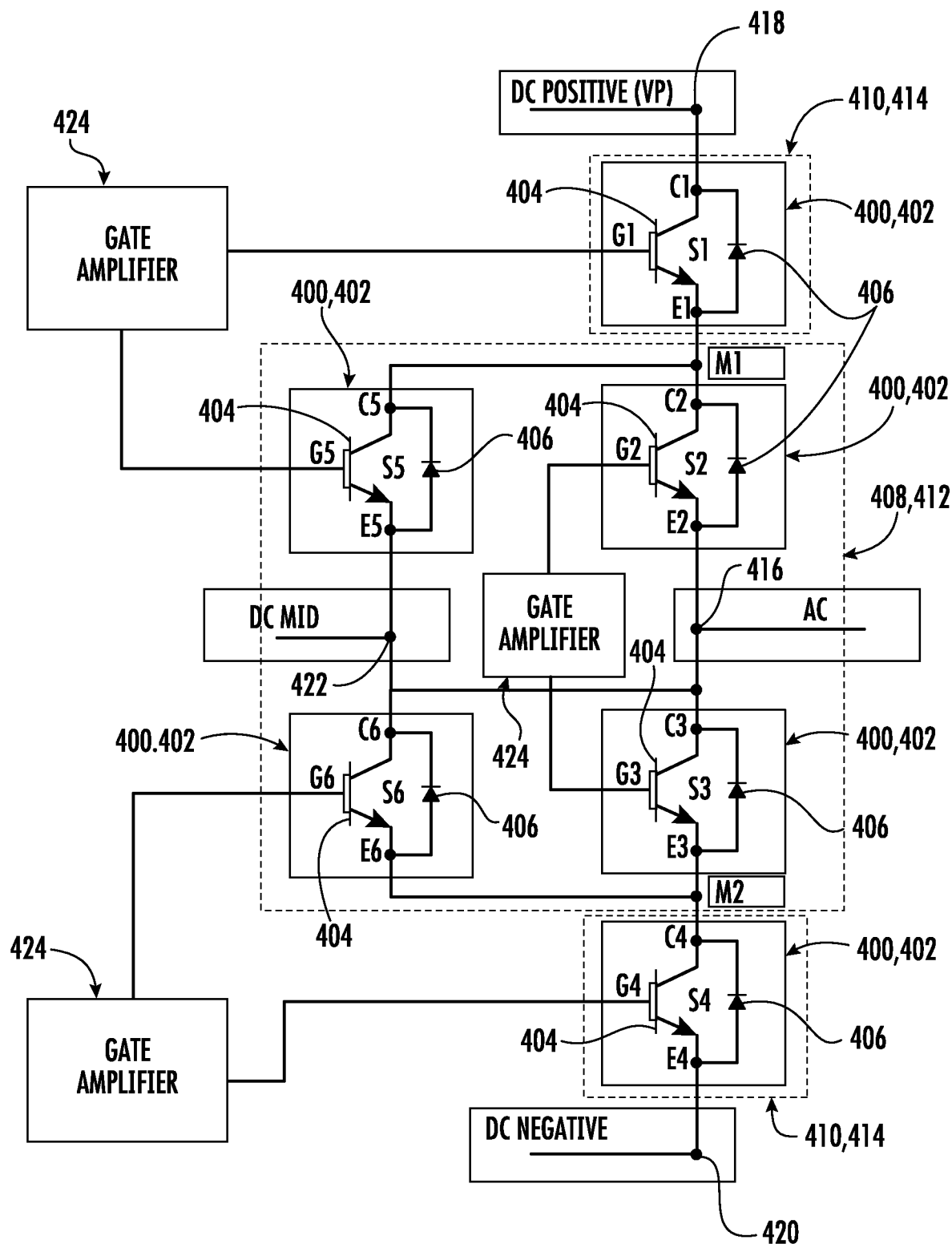
FIG. 6 illustrates a schematic diagram of a plurality of IGBTs connected according to the present disclosure.

As shown at (302), the method 300 includes providing a plurality of switching devices 400 of the power converter 262 in one of a neutral point clamped topology or an active neutral point clamped topology. For example, as shown in FIGS. 5-6, the switching devices 400 may be insulated gate bipolar transistor (IGBT) modules 402. In such embodiments, as shown, each of the plurality of IGBT modules 402 may include at least one IGBT switch 404 (also numbered S1, S2, S3, S4, S5, and S6) and at least one antiparallel diode 406. Furthermore, as shown particularly in FIG. 6, the plurality of switching devices 400 may include a first group 408 and a second group 410 of switching devices 400. In such embodiments, the first group 408 may correspond to inner switching devices 412, whereas the second group 410 may correspond to outer switching devices 414. More specifically, as shown, the second IGBT module S2, the third IGBT module S3, the fifth IGBT module S5, and the sixth IGBT module S6 are the inner switching devices 412, and the first IGBT module S1 and the fourth IGBT module S4 are the outer switching devices 414.

In addition, as shown in FIGS. 5 and 6, the power converter 262 may include various terminals, such as an alternating current (AC) terminal 416, a positive voltage terminal 418, a negative voltage terminal 420, and a midpoint voltage terminal 422 that can be used to control the various operating states of the power converter 262.

Referring back to FIG. 6, as shown at (304), the method 300 includes providing a plurality of deadtimes for the plurality of switching devices 400 of the power converter 262. Thus, as shown at (306), the method 300 includes selecting one of the plurality of deadtimes for each of the switching devices 400 such that at least two of the plurality of switching devices 400 operate according to different deadtimes of the plurality of deadtimes. For example, in an embodiment, the method 300 may also include selecting one of the deadtimes for each of the switching devices 400 such that at least two of the switching devices 400 operate according to different deadtimes based on one or more switching properties of each of the switching devices 400. For example, in an embodiment, the switching properties described herein may include temperature and/or location of the switching device 400 in the power converter 262.

Moreover, in an embodiment, selecting one of the plurality of deadtimes for each of the plurality of switching devices 400 such that at least two of the switching devices 400 operate according to different deadtimes may include selecting a first deadtime for the inner switching devices and selecting a second deadtime for the outer switching devices. In such embodiments, the first deadtime is greater than the second deadtime. In particular embodiments, for example, the second deadtime is equal to about half of the first deadtime.

For example, in an embodiment, the first IGBT module S1 and the fourth IGBT module S4 are the most commonly switched IGBTs when modulating a three-level NPC bridge. Further, the second IGBT module S2, the third IGBT module S3, the fifth IGBT module S5, and the sixth IGBT module S6 are typically switched only once per half-cycle of the fundamental frequency (e.g., 50 Hz or 60 Hz; or generator frequency). Further, in an embodiment, the first IGBT module S1 and the fourth IGBT module S4 switch fast, so they can use their own relatively short lockout time/deadtime to minimize distortion. In contrast, the second IGBT module S2, the third IGBT module S3, the fifth IGBT module S5, and the sixth IGBT module S6 switch slowly and require a longer lockout time.

Referring still to FIG. 4, as shown at (308), the method 300 includes operating the plurality of switching devices 400 at the selected deadtimes to allow a first group of the plurality of switching devices to switch slower than a second group of the plurality of switching devices such that the first group of the plurality of switching devices satisfy safe operating requirements while the second group of the plurality of switching devices switch faster than the first group of the plurality of switching devices, e.g., in order to minimize harmonic distortion.

In additional embodiments, the method 300 may include operating the plurality of switching devices 400 at the selected deadtimes via a plurality of gate drivers. In such embodiments, as shown in FIG. 6, the method 300 may optionally include electrically coupling a gate amplifier 424 at a connection between one or more of the first and fifth IGBT modules 1, 5, the second and third IGBT modules 2, 3, and/or the fourth and sixth IGBT modules 4, 6. Thus, in particular embodiments, as shown, the gate amplifiers 434 are connected to respective gates (e.g., G1, G2, G3, G4, G5, and G6) of the IGBT modules 402.

Figure 7:
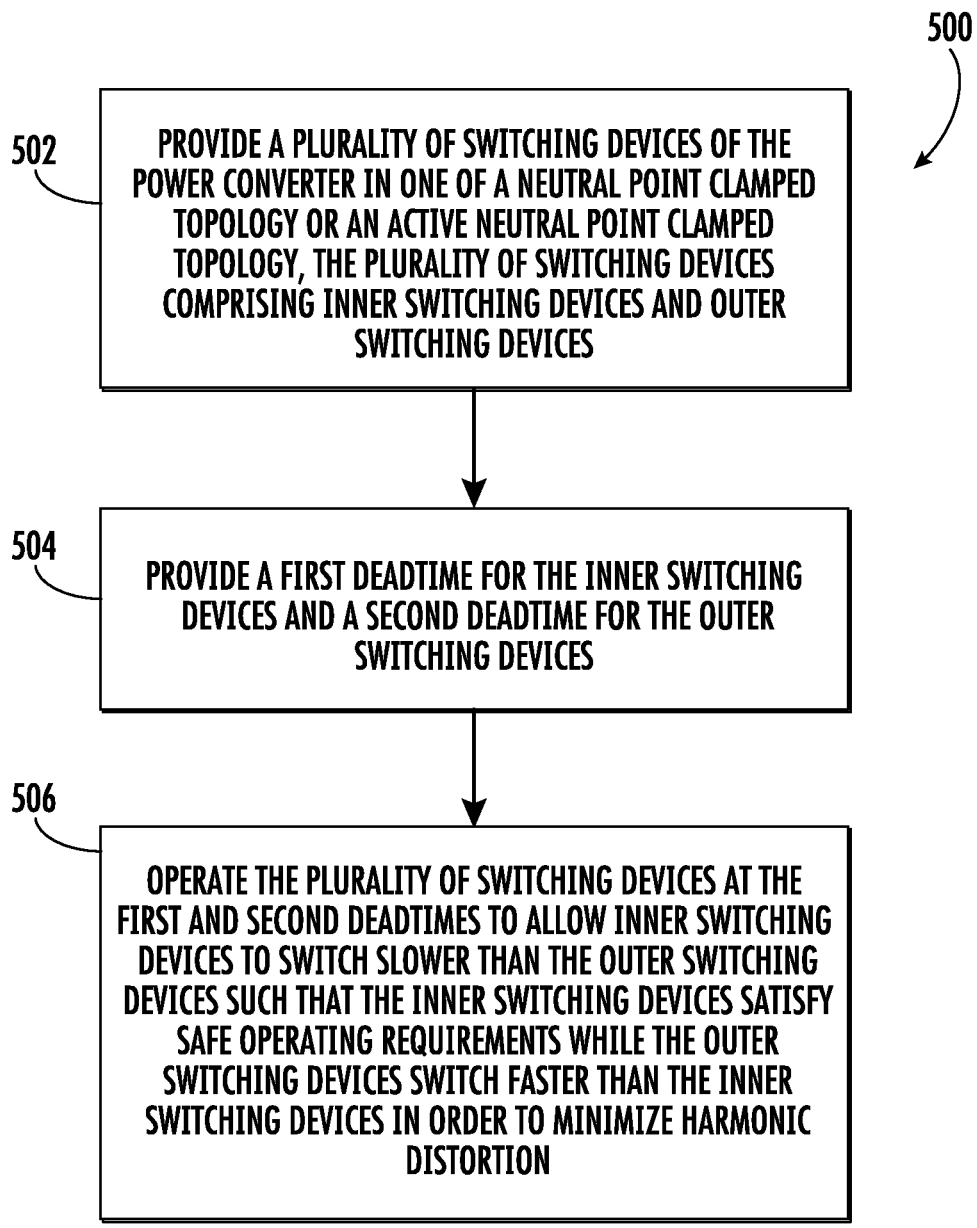
FIG. 7 illustrates a flow diagram of one embodiment of a method for operating a multi-level bridge power converter of an electrical power system connected to a power grid according to the present disclosure.

Referring now to FIG. 7, a flow diagram of another embodiment of a method 500 for operating a multi-level bridge power converter of an electrical power system connected to a power grid is illustrated in accordance with aspects of the present subject matter. In general, the method 500 will be described herein as being implemented using a wind turbine system, such as the DFIG wind turbine system 200 described above with reference to FIGS. 1-2 and 5-6. However, it should be appreciated that the disclosed method 500 may be implemented using any other suitable power generation system that is configured to supply power for application to a load. In addition, although FIG. 7 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (502), the method 500 includes providing a plurality of switching devices of the power converter in one of a neutral point clamped topology or an active neutral point clamped topology. Further, the plurality of switching devices include inner switching devices and outer switching devices. As shown at (504), the method 500 includes providing a first deadtime for the inner switching devices and a second deadtime for the outer switching devices. As shown at (506), the method 500 includes operating the plurality of switching devices at the first and second deadtimes to allow inner switching devices to switch slower than the outer switching devices such that the inner switching devices satisfy safe operating requirements while the outer switching devices switch faster than the inner switching devices, e.g., in order to minimize harmonic distortion.

Further aspects of the disclosure are provided by the subject matter of the following clauses:

Clause 1. A method for operating a multi-level bridge power converter of an electrical power system connected to a power grid, the power converter having a first converter coupled to a second converter via a DC link, the method comprising: providing a plurality of switching devices of the power converter in one of a neutral point clamped topology or an active neutral point clamped topology;

providing a plurality of deadtimes for the plurality of switching devices of the power converter;

selecting one of the plurality of deadtimes for each of the plurality of switching devices such that at least two of the plurality of switching devices operate according to different deadtimes of the plurality of deadtimes; and operating the plurality of switching devices at the selected deadtimes to allow a first group of the plurality of switching devices to switch slower than a second group of the plurality of switching devices such that the first group of the plurality of switching devices satisfy safe operating requirements while the second group of the plurality of switching devices switch faster than the first group of the plurality of switching devices.

Clause 2. The method of clause 1, further comprising selecting one of the plurality of deadtimes for each of the plurality of switching devices such that at least two of the plurality of switching devices operate according to different deadtimes of the plurality of deadtimes based on one or more switching properties of each of the plurality of switching devices.

Clause 3. The method of any of the preceding clauses, wherein the plurality of switching devices comprises, at least, a plurality of insulated gate bipolar transistor (IGBT) modules, wherein each of the plurality of IGBT modules comprises at least one IGBT switch and at least one antiparallel diode.

Clause 4. The method of clause 3, wherein the plurality of IGBT modules comprises a first IGBT module comprising a first IGBT switch coupled to a first antiparallel diode, a second IGBT module comprising a second IGBT switch coupled to a second antiparallel diode, a third IGBT module comprising a third IGBT switch coupled to a third antiparallel diode, a fourth IGBT module comprising a fourth IGBT switch coupled to a fourth antiparallel diode, a fifth IGBT module comprising a fifth IGBT switch coupled to a fifth antiparallel diode, and a sixth IGBT module comprising a sixth IGBT switch coupled to a sixth antiparallel diode, the at least one antiparallel diode comprising at least one of the first antiparallel diode, the second antiparallel diode, the third antiparallel diode, the fourth antiparallel diode, the fifth antiparallel diode, or the sixth antiparallel diode.

Clause 5. The method of clause 4, wherein the first group of the plurality of switching devices comprise inner switching devices of the plurality of switching devices and the second group of the plurality of switching devices comprise outer switching devices, wherein the second IGBT module, the third IGBT module, the fifth IGBT module, and the sixth IGBT module are the inner switching devices, and wherein the first IGBT module and the fourth IGBT module are the outer switching devices.

Clause 6. The method of clause 5, wherein selecting one of the plurality of deadtimes for each of the plurality of switching devices such that at least two of the plurality of switching devices operate according to different deadtimes of the plurality of deadtimes further comprises:

selecting a first deadtime of the plurality of deadtimes for the inner switching devices; and selecting a second deadtime of the plurality of deadtimes for the outer switching devices, the first deadtime being greater than the second deadtime.

Clause 7. The method of clause 6, wherein the second deadtime is equal to about half of the first deadtime.

Clause 8. The method of any of the preceding clauses, further comprising operating the plurality of switching devices at the selected deadtimes via a plurality of gate drivers.

Clause 9. The method of any of the preceding clauses, wherein the multi-level bridge power converter is a three-level bridge power converter, and wherein the electrical power system comprises a wind turbine power system, a solar power system, an energy storage power system, or combinations thereof.

Clause 10. An electrical power system, comprising:
a doubly-fed induction generator having a rotor and a stator, the stator providing AC power to a stator bus;
a multi-level bridge power converter coupled to the rotor of the doubly-fed induction generator, the power converter comprising a first converter coupled to a second converter via a DC link, at least one of the first converter or the second converter comprising a plurality of switching devices arranged in one of a neutral point clamped topology or an active neutral point clamped topology;
a controller communicatively coupled to the power converter, the controller comprising at least one processor configured to implement a plurality of operations, the plurality of operations comprising:
selecting one of a plurality of deadtimes for each of the plurality of switching devices such that at least two of the plurality of switching devices operate according to different deadtimes of the plurality of deadtimes; and
operating the plurality of switching devices at the selected deadtimes to allow a first group of the plurality of switching devices to switch slower than a second group of the plurality of switching devices such that the first group of the plurality of switching devices satisfy safe operating requirements while the second group of the plurality of switching devices switch faster than the first group of the plurality of switching devices.

Clause 11. The system of clause 10, wherein the plurality of operations further comprise selecting one of the plurality of deadtimes for each of the plurality of switching devices such that at least two of the plurality of switching devices operate according to different deadtimes of the plurality of deadtimes based on one or more switching properties of each of the plurality of switching devices.

Clause 12. The system of clauses 10-11, wherein the plurality of switching devices comprises, at least, a plurality of insulated gate bipolar transistor (IGBT) modules, wherein each of the plurality of IGBT modules comprises at least one IGBT switch and at least one antiparallel diode.

Clause 13. The system of clause 12, wherein the plurality of IGBT modules comprises a first IGBT module comprising a first IGBT switch coupled to a first antiparallel diode, a second IGBT module comprising a second IGBT switch coupled to a second antiparallel diode, a third IGBT module comprising a third IGBT switch coupled to a third antiparallel diode, a fourth IGBT module comprising a fourth IGBT switch coupled to a fourth antiparallel diode, a fifth IGBT module comprising a fifth IGBT switch coupled to a fifth antiparallel diode, and a sixth IGBT module comprising a sixth IGBT switch coupled to a sixth antiparallel diode, the at least one antiparallel diode comprising at least one of the first antiparallel diode, the second antiparallel diode, the third antiparallel diode, the fourth antiparallel diode, the fifth antiparallel diode, or the sixth antiparallel diode.

Clause 14. The system of clause 13, wherein the first group of the plurality of switching devices comprise inner switching devices of the plurality of switching devices and the second group of the plurality of switching devices comprise outer switching devices, wherein the second IGBT module, the third IGBT module, the fifth IGBT module, and the sixth IGBT module are the inner switching devices, and wherein the first IGBT module and the fourth IGBT module are the outer switching devices.

Clause 15. The system of clause 14, wherein selecting one of the plurality of deadtimes for each of the plurality of switching devices such that at least two of the plurality of switching devices operate according to different deadtimes of the plurality of deadtimes further comprises:
selecting a first deadtime of the plurality of deadtimes for the inner switching devices; and
selecting a second deadtime of the plurality of deadtimes for the outer switching devices, the first deadtime being greater than the second deadtime.

Clause 16. The system of clause 15, wherein the second deadtime is equal to about half of the first deadtime.

Clause 17. The system of clauses 10-16, further comprising operating the plurality of switching devices at the selected deadtimes via a plurality of gate drivers.

Clause 18. The system of clauses 10-17, wherein the multi-level bridge power converter is a three-level bridge power converter, and wherein the electrical power system comprises a wind turbine power system, a solar power system, an energy storage power system, or combinations thereof.

Clause 19. A method for operating a multi-level bridge power converter of an electrical power system connected to a power grid, the power converter having a first converter coupled to a second converter via a DC link, the method comprising:
providing a plurality of switching devices of the power converter in one of a neutral point clamped topology or an active neutral point clamped topology, the plurality of switching devices comprising inner switching devices and outer switching devices;
providing a first deadtime for the inner switching devices and a second deadtime for the outer switching devices; and
operating the plurality of switching devices at the first and second deadtimes to allow inner switching devices to switch slower than the outer switching devices such that the inner switching devices satisfy safe operating requirements while the outer switching devices switch faster than the inner switching devices.

Clause 20. The method of clause 19, further comprising selecting one of the first and second deadtimes for each of the inner and outer switching devices such that the inner and outer switching devices operate according to different deadtimes based on one or more switching properties of each of the inner and outer switching devices.

This written description uses examples to disclose the disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A method for operating a multi-level bridge power converter of an electrical power system connected to a power grid, the power converter having a first converter coupled to a second converter via a DC link, the method comprising:
providing a plurality of switching devices of the power converter in one of a neutral point clamped topology or an active neutral point clamped topology;

providing a plurality of deadtimes for the plurality of switching devices of the power converter;

selecting one of the plurality of deadtimes for each of the plurality of switching devices such that at least two of the plurality of switching devices operate according to different deadtimes of the plurality of deadtimes; and operating the plurality of switching devices at the selected deadtimes to allow a first group of the plurality of switching devices to switch slower than a second group of the plurality of switching devices such that the first group of the plurality of switching devices satisfy safe operating requirements while the second group of the plurality of switching devices switch faster than the first group of the plurality of switching devices.

2. The method of claim 1, further comprising selecting one of the plurality of deadtimes for each of the plurality of switching devices such that at least two of the plurality of switching devices operate according to different deadtimes of the plurality of deadtimes based on one or more switching properties of each of the plurality of switching devices.

3. The method of claim 1, wherein the plurality of switching devices comprises, at least, a plurality of insulated gate bipolar transistor (IGBT) modules, wherein each of the plurality of IGBT modules comprises at least one IGBT switch and at least one antiparallel diode.

4. The method of claim 3, wherein the plurality of IGBT modules comprises a first IGBT module comprising a first IGBT switch coupled to a first antiparallel diode, a second IGBT module comprising a second IGBT switch coupled to a second antiparallel diode, a third IGBT module comprising a third IGBT switch coupled to a third antiparallel diode, a fourth IGBT module comprising a fourth IGBT switch coupled to a fourth antiparallel diode, a fifth IGBT module comprising a fifth IGBT switch coupled to a fifth antiparallel diode, and a sixth IGBT module comprising a sixth IGBT switch coupled to a sixth antiparallel diode, the at least one antiparallel diode comprising at least one of the first antiparallel diode, the second antiparallel diode, the third antiparallel diode, the fourth antiparallel diode, the fifth antiparallel diode, or the sixth antiparallel diode.

5. The method of claim 4, wherein the first group of the plurality of switching devices comprise inner switching devices of the plurality of switching devices and the second group of the plurality of switching devices comprise outer switching devices, wherein the second IGBT module, the third IGBT module, the fifth IGBT module, and the sixth IGBT module are the inner switching devices, and wherein the first IGBT module and the fourth IGBT module are the outer switching devices.

6. The method of claim 5, wherein selecting one of the plurality of deadtimes for each of the plurality of switching devices such that at least two of the plurality of switching devices operate according to different deadtimes of the plurality of deadtimes further comprises:

selecting a first deadtime of the plurality of deadtimes for the inner switching devices; and selecting a second deadtime of the plurality of deadtimes for the outer switching devices, the first deadtime being greater than the second deadtime.

7. The method of claim 6, wherein the second deadtime is equal to about half of the first deadtime.

8. The method of claim 1, further comprising operating the plurality of switching devices at the selected deadtimes via a plurality of gate drivers.

9. The method of claim 1, wherein the multi-level bridge power converter is a three-level bridge power converter, and wherein the electrical power system comprises a wind turbine power system, a solar power system, an energy storage power system, or combinations thereof.

10. An electrical power system, comprising:

a doubly-fed induction generator having a rotor and a stator, the stator providing AC power to a stator bus;

a multi-level bridge power converter coupled to the rotor of the doubly-fed induction generator, the power converter comprising a first converter coupled to a second converter via a DC link, at least one of the first converter or the second converter comprising a plurality of switching devices arranged in one of a neutral point clamped topology or an active neutral point clamped topology;

a controller communicatively coupled to the power converter, the controller comprising at least one processor configured to implement a plurality of operations, the plurality of operations comprising:

selecting one of a plurality of deadtimes for each of the plurality of switching devices such that at least two of the plurality of switching devices operate according to different deadtimes of the plurality of deadtimes; and operating the plurality of switching devices at the selected deadtimes to allow a first group of the plurality of switching devices to switch slower than a second group of the plurality of switching devices such that the first group of the plurality of switching devices satisfy safe operating requirements while the second group of the plurality of switching devices switch faster than the first group of the plurality of switching devices.

11. The system of claim 10, wherein the plurality of operations further comprise selecting one of the plurality of deadtimes for each of the plurality of switching devices such that at least two of the plurality of switching devices operate according to different deadtimes of the plurality of deadtimes based on one or more switching properties of each of the plurality of switching devices.

12. The system of claim 10, wherein the plurality of switching devices comprises, at least, a plurality of insulated gate bipolar transistor (IGBT) modules, wherein each of the plurality of IGBT modules comprises at least one IGBT switch and at least one antiparallel diode.

13. The system of claim 12, wherein the plurality of IGBT modules comprises a first IGBT module comprising a first IGBT switch coupled to a first antiparallel diode, a second IGBT module comprising a second IGBT switch coupled to a second antiparallel diode, a third IGBT module comprising a third IGBT switch coupled to a third antiparallel diode, a fourth IGBT module comprising a fourth IGBT switch coupled to a fourth antiparallel diode, a fifth IGBT module comprising a fifth IGBT switch coupled to a fifth antiparallel diode, and a sixth IGBT module comprising a sixth IGBT switch coupled to a sixth antiparallel diode, the at least one antiparallel diode comprising at least one of the first antiparallel diode, the second antiparallel diode, the third antiparallel diode, the fourth antiparallel diode, the fifth antiparallel diode, or the sixth antiparallel diode.

14. The system of claim 13, wherein the first group of the plurality of switching devices comprise inner switching devices of the plurality of switching devices and the second group of the plurality of switching devices comprise outer switching devices, wherein the second IGBT module, the third IGBT module, the fifth IGBT module, and the sixth IGBT module are the inner switching devices, and wherein the first IGBT module and the fourth IGBT module are the outer switching devices.

15. The system of claim 14, wherein selecting one of the plurality of deadtimes for each of the plurality of switching devices such that at least two of the plurality of switching devices operate according to different deadtimes of the plurality of deadtimes further comprises:
   selecting a first deadtime of the plurality of deadtimes for the inner switching devices; and
   selecting a second deadtime of the plurality of deadtimes for the outer switching devices, the first deadtime being greater than the second deadtime.

16. The system of claim 15, wherein the second deadtime is equal to about half of the first deadtime.

17. The system of claim 10, further comprising operating the plurality of switching devices at the selected deadtimes via a plurality of gate drivers.

18. The system of claim 10, wherein the multi-level bridge power converter is a three-level bridge power converter, and wherein the electrical power system comprises a wind turbine power system, a solar power system, an energy storage power system, or combinations thereof.

19. A method for operating a multi-level bridge power converter of an electrical power system connected to a power grid, the power converter having a first converter coupled to a second converter via a DC link, the method comprising:
   providing a plurality of switching devices of the power converter in one of a neutral point clamped topology or an active neutral point clamped topology, the plurality of switching devices comprising inner switching devices and outer switching devices;
   providing a first deadtime for the inner switching devices and a second deadtime for the outer switching devices; and
   operating the plurality of switching devices at the first and second deadtimes to allow inner switching devices to switch slower than the outer switching devices such that the inner switching devices satisfy safe operating requirements while the outer switching devices switch faster than the inner switching devices.

20. The method of claim 19, further comprising selecting one of the first and second deadtimes for each of the inner and outer switching devices such that the inner and outer switching devices operate according to different deadtimes based on one or more switching properties of each of the inner and outer switching devices.

* * * * *